United States Patent

[11] 3,628,805

| [72] | Inventor | Jean Archer<br>Valentigney, France |
|------|----------|-------------------------------------|
| [21] | Appl. No. | 30,718 |
| [22] | Filed | Apr. 22, 1970 |
| [45] | Patented | Dec. 21, 1971 |
| [73] | Assignee | Cycles Peugeot<br>Beaulieu-Valentigney, France |
| [32] | Priority | Apr. 30, 1969 |
| [33] | | France |
| [31] | | 6913855 |

[54] HANDLING TRUCK
6 Claims, 4 Drawing Figs.

[52] U.S. Cl. ................................................ 280/33.99 T, 108/53
[51] Int. Cl. ................................................ B60p 9/00
[50] Field of Search ...................................... 280/33.99 T, 33.99 R, 34 B, 79.1, 79.3; 108/53

[56] References Cited
UNITED STATES PATENTS

| 2,330,852 | 10/1943 | White | 108/53 |
| 2,827,302 | 3/1958 | Skyrud | 280/33.99 T |
| 3,195,481 | 7/1965 | Verguin | 108/53 |
| 3,207,095 | 9/1965 | Hiatt, Jr. | 108/53 |
| 3,415,532 | 12/1968 | Fingerut et al. | 280/33.99 T X |
| 3,522,954 | 8/1970 | Locke | 280/33.99 T |

FOREIGN PATENTS

| 1,315,823 | 12/1962 | France | 280/33.99 T |

*Primary Examiner*—Leo Friaglia
*Assistant Examiner*—Milton L. Smith
*Attorney*—Sughrue, Rothwell, Mion, Zinn & Macpeak ABSTRACT: Handling truck having a platform including two U-section side members constituting two sides of the platform. Two U-section supports are mounted on each side member and arranged in facing relation to each other so as to receive vertical grills in the recesses defined by the flanges of the U-section supports. Several similar truck platforms can be stacked on each other by engagement of outer flanges of their U-section side members in the recesses of the U-section supports of another handling truck platform.

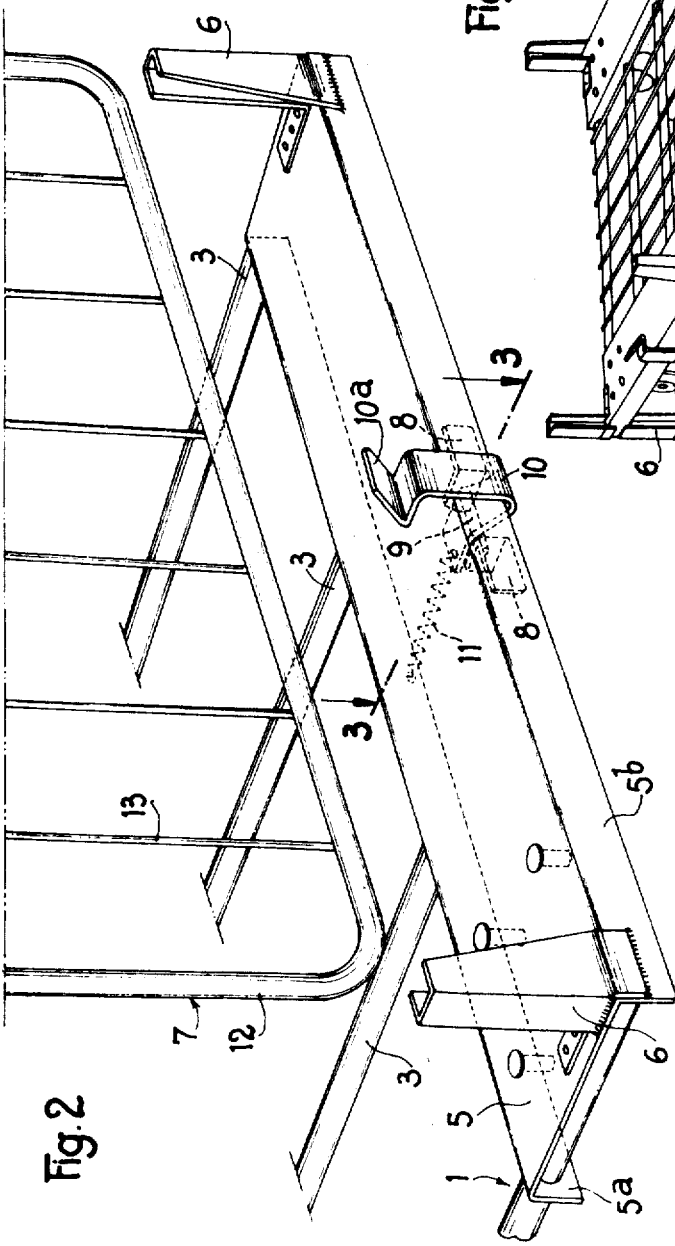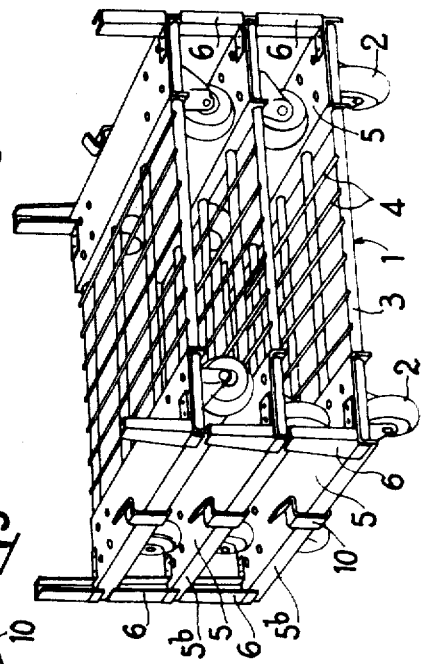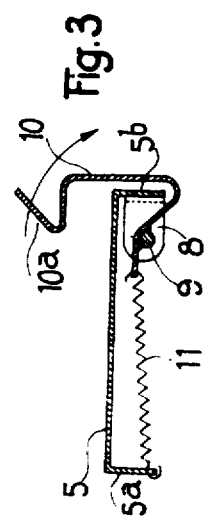

HANDLING TRUCK

The present invention relates to handling trucks of the type having a platform or pallet mounted on rollers and at least two grills detachably secured to the platform.

The object of the invention is to provide a truck of the aforementioned type which is so improved as to be capable of being disassembled or assembled in a particularly simple and convenient manner and whose platform can be piled or stacked with similar truck platforms.

The invention provides a handling truck, wherein the platform comprises two U-section side members which constitute two sides of the platform and on each of which are provided two vertical corner members constituting U-section supports which are arranged in facing relation to each other for receiving the uprights of a detachable grill, the arrangement being such that, for the purpose of stacking similar truck platforms, the outer flange of each side member of a platform is engageable in two corresponding supports of another platform.

The platforms from which the grills have been removed are stacked in a particularly simple and efficient manner owing to the effect of the side members and supports. The latter moreover guide and position the grills when the truck is assembled for subsequent use.

Further features and advantages of the invention will be apparent from the ensuing description with reference to the accompanying drawings.

In the drawings:

FIG. 2 is a partial perspective view, on an enlarged scale, of the truck showing how the grill is mounted;

FIG. 3 is a sectional view taken along line 3—3 of FIG. 2, and

FIG. 4 is a perspective view of the stacking of the platforms of trucks according to the invention.

Figure 1:
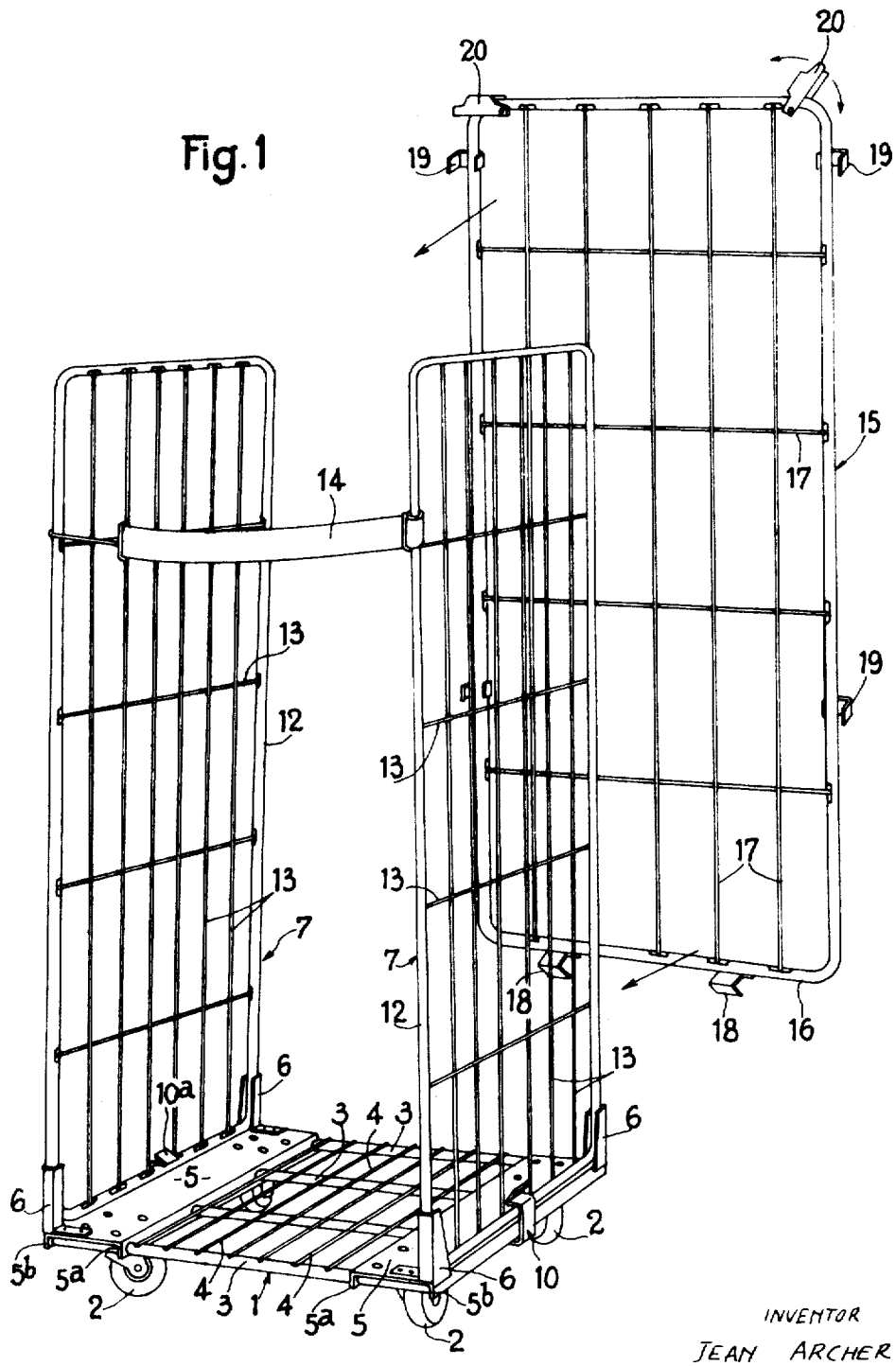
FIG. 1 is a perspective view of a handling truck according to the invention.

In the embodiment shown in the drawings, the handling truck according to the invention comprises a rectangular platform or pallet 1 mounted on rollers or small wheels 2. Two of the latter are carried by fixed forks and the other two by pivotable forks.

The platform comprises a grill having longitudinal tubular elements 3 to which are welded transverse metal wires 4, and two U-section side or end members 5 constituting the small sides of this platform.

These side members 5 are of folded sheet metal stock and have an inverted U-section. The tubular elements 3 extend through the inner flange $5^a$ of each side member. The forks of the rollers are secured to the side members 5 by means of welded studs.

Fixed to each side member 5 are two vertical U-section corner members or supports 6 disposed in facing relation to each other so as to guide and receive a lateral grill 7. These supports enable similar truck platforms to be stacked, since the arrangement is such that the outer flange $5^b$ of each side member 5 of a given platform is engageable is corresponding two supports 6 of another platform and locks the side member 5 in the longitudinal direction (FIG. 4).

Fixed under each side member 5 and secured to the outer flange $5^b$ are two brackets 8 in which is journaled a spindle 9. The latter is fixed, as by welding, to a pivotable hook 10 which projects beyond the side member 5 and is biased to a vertical position by a tension spring 11. The latter has one end secured to the inner end of the hook 10 and its other end to an aperture in the inner flange $5^a$ of the side member 5. The outer end $10^a$ of the hook is bent in such manner as to afford a face which guides the grill 7, which is engaged in the supports 6 when it is mounted in position, and lock the grill in position after engagement owing to the action of the return spring 11. For this purpose, the lower part of the tubular frame 12 of the grill 7 engages under the bent end portion $10^a$ of the hook.

The hook 10 also serves as an unlocking pedal when unlocking the grill by a simple action of the foot on this bent portion $10^a$ which moves the latter in the direction of the arrow in FIG. 3.

Each of the lateral grills 7 comprises a tubular frame 12 and vertical and horizontal metal wires secured to this frame.

The grills 7 are interconnected by a strap 14, for example of rubber, which can be removed when it is desired to mount one or two grills so as to partly or completely close the truck. Such an end grill is shown at 15 (FIG. 1) ready for mounting. Each end grill is constructed in the same way as the lateral grills 7, namely with a tubular frame 16 and metal wires 17. Welded to the base of the frame 15 are two bent sheet metal tabs 18 constituting hooks which are adapted to pass behind and engage under the outer tubular element 3 of the platform 1. Welded to the two uprights of the frame 16 are two pairs of sheet metal tabs 19 which, upon mounting the grill 15, pass outside and engage the corresponding uprights of the lateral grills 7 so as to prevent the grills from moving apart outwardly of the truck. Pivoted to the upper part of the end grill 15 are two U-section locking elements 20 which are adapted to be lowered so as to lock the frame of the end grill to the frame of the lateral grills 7. When the grills 15 are in position, they are thus rigidly assembled with the rest of the truck by the hooks 18, the tabs 19 and the locking elements 20.

Having now described my invention what I claim and desire to secure by Letters Patent is:

1. A handling truck comprising a platform, and rolling means supporting the platform the platform comprising two U-section side members having outer flanges and constituting two sides of the platform two substantially vertically extending corner members mounted on each side member and constituting U-section supports defining substantially vertically extending recesses, the supports being adapted and arranged in such manner that pairs of the supports have their recesses in facing relation to each other for receiving uprights of a detachable grill, and, for the purpose of stacking a plurality of similar truck platforms, the outer flange of each side member of a platform is engageable in two corresponding supports of another platform.

2. A handling truck as claimed in claim 1, comprising a hook pivotably mounted on each side member and adapted to lock the corresponding grill in position on the platform, and resiliently yieldable means combined with the hook to bias the hook to a grill-locking position.

3. A handling truck as claimed in claim 2, said hook being adapted to be pivoted to a grill-unhooking position by the action of an operator's foot in the manner of a pedal.

4. A handling truck as claimed in claim 2, wherein each hook has one end portion mounted under the corresponding side member by means of a spindle journaled in two brackets.

5. A handling truck having a platform and rolling means supporting the platform and two detachable first grills having uprights, the platform comprising two U-section side members having outer flanges and constituting two sides of the platform, two substantially vertically extending corner members mounted on each side member and constituting U-section supports defining substantially vertically extending recesses, the supports being adapted and arranged in such manner that pairs of the supports have their recesses in facing relation to each other for receiving said uprights of the corresponding detachable grill, and, for the purpose of stacking a plurality of similar truck platforms, the outer flange of each side members of a platform is engageable in two corresponding supports of another platform, said truck further comprising an additional detachable grill combined with locking means which are engaged with the platform and with said first grills.

6. A handling truck as claimed in claim 5, wherein the locking means comprise lower hooks engaged with the platform, lateral tabs engaged with said uprights and upper pivotable locking elements engaged with said first grills.

* * * * *